US008613825B2

(12) United States Patent
Zhou et al.

(10) Patent No.: US 8,613,825 B2
(45) Date of Patent: Dec. 24, 2013

(54) METHOD FOR FIXING GLASS SUBSTRATES AND METHOD FOR PREPARING FLEXIBLE DISPLAY DEVICE

(75) Inventors: Weifeng Zhou, Beijing (CN); Jianshe Xue, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 58 days.

(21) Appl. No.: 13/407,849

(22) Filed: Feb. 29, 2012

(65) Prior Publication Data

US 2012/0234480 A1    Sep. 20, 2012

(30) Foreign Application Priority Data

Mar. 16, 2011  (CN) .......................... 2011 1 0063833

(51) Int. Cl.
| | |
|---|---|
| *B29C 65/48* | (2006.01) |
| *B32B 37/12* | (2006.01) |
| *B32B 38/10* | (2006.01) |
| *C09J 5/00* | (2006.01) |
| *B29C 63/00* | (2006.01) |

(52) U.S. Cl.
USPC ............... 156/247; 156/275.3; 156/275.7; 156/307.3; 156/704

(58) Field of Classification Search
USPC ........... 156/247, 272.2, 273.3, 273.5, 275.1, 156/275.3, 275.5, 275.7, 307.1, 307.3, 156/307.7, 703, 704
See application file for complete search history.

(56) References Cited

U.S. PATENT DOCUMENTS

| | | | | | |
|---|---|---|---|---|---|
| 4,470,858 | A | * | 9/1984 | McMaster | 156/103 |
| 4,510,190 | A | * | 4/1985 | Glaser | 428/34 |
| 4,839,557 | A | * | 6/1989 | Schrank | 313/509 |
| 5,066,112 | A | * | 11/1991 | Lynam et al. | 359/267 |
| 5,137,770 | A | * | 8/1992 | Rothe et al. | 428/192 |
| 5,575,577 | A | * | 11/1996 | Kawakami et al. | 400/705.1 |
| 5,670,966 | A | * | 9/1997 | Dishart et al. | 343/713 |
| 5,710,612 | A | * | 1/1998 | Mase | 349/149 |
| 5,710,655 | A | * | 1/1998 | Rumbaugh et al. | 359/249 |
| 5,883,465 | A | * | 3/1999 | Inoguchi et al. | 313/509 |
| 5,959,762 | A | * | 9/1999 | Bandettini et al. | 359/265 |
| 6,031,051 | A | * | 2/2000 | Wu | 525/243 |
| 6,172,730 | B1 | * | 1/2001 | Fujita | 349/149 |
| 6,461,885 | B1 | * | 10/2002 | Lupo et al. | 438/29 |
| 6,480,254 | B1 | * | 11/2002 | Fujita | 349/149 |
| 6,806,936 | B2 | * | 10/2004 | Nakaminami et al. | 349/149 |
| 7,411,230 | B2 | * | 8/2008 | Maeda et al. | 257/225 |
| 7,602,121 | B2 | * | 10/2009 | Aitken et al. | 313/512 |
| 7,826,123 | B2 | * | 11/2010 | McCabe et al. | 359/265 |
| 8,277,059 | B2 | * | 10/2012 | Mccabe et al. | 359/603 |
| 2006/0008625 | A1 | * | 1/2006 | Recker et al. | 428/195.1 |
| 2006/0009109 | A1 | * | 1/2006 | Aitken et al. | 445/24 |
| 2012/0006400 | A1 | * | 1/2012 | Tai et al. | 136/256 |
| 2012/0234480 | A1 | * | 9/2012 | Zhou et al. | 156/247 |

* cited by examiner

*Primary Examiner* — Sing P Chan
(74) *Attorney, Agent, or Firm* — Ladas & Parry LLP

(57) ABSTRACT

Embodiments of the disclosed technology disclose a method for fixing glass substrates and a method for preparing a flexible display device. The method for fixing glass substrates comprises coating an edge portion of a first glass substrate corresponding to a second glass substrate with epoxy resin and screeding the coated epoxy resin layer, adhering the second glass substrate to the first glass substrate, and annealing the two glass substrates. With the technical solution of this disclosed technology, the time period for fixing the adhered glass substrates can be reduced with an improved productivity.

14 Claims, 2 Drawing Sheets

METHOD FOR FIXING GLASS SUBSTRATES AND METHOD FOR PREPARING FLEXIBLE DISPLAY DEVICE

BACKGROUND

Embodiments of the disclosed technology relate to a method for fixing glass substrates and a method for preparing a flexible display device.

During the latest ten years, a rapid progress happens in the field of panel display, and great improvements are achieved with regard to screen size and displaying quality. Through continuous efforts, performances of liquid crystal displays (LCDs) in various aspects have closed to the levels of conventional cathode ray tube (CRT) displays, and a tendency of replacing the CRT displays with LCDs obviously occurs.

As production capacity for panel display products increases continuously, the competition among manufacturers is also becoming brutal, and all manufacturers, while improving performance of panel display products continuously, are making efforts to reduce production costs for panel display products, thereby strengthen their market competitive powers. A flexible display device has characteristics of bendability, which enables it suitable for many applications in need of curved display, such as smart card, e-paper, smart tags, and applications suitable for conventional displays. Furthermore, in the future, flexible display devices may take an enormous market share in the field of panel display products with its fantastic beautiful appearance.

Conventionally, flexible display devices are mainly manufactured based on organic material substrates, for example, cholesteric phase LCD, electrophoresis display, and OLED (Organic Light-Emitting Display) or the like manufactured on organic substrates such as polyimide, polyethylene terephthalate films (PET), polyethylene terephthalate (PETP) and the like. Glass substrates are superior to organic material substrates in light transmittance, chemical stability, waterproof capability and dielectric performance; moreover, ultrathin glass substrates also have good flexibility; however, because of the fragility of glass substrates, the application of glass substrates in large-size screen panel display products is remarkably limited, and it is also very difficult to separately transfer and process ultrathin glass substrates.

SUMMARY

An embodiment of the disclosed technology provides a method for fixing glass substrates, which shortens the time period for fixing the adhered glass substrates while improving productivity.

An embodiment of the disclosed technology provides a method for fixing glass substrates, comprising: coating an edge portion of a first glass substrate corresponding to a second glass substrate with epoxy resin and screeding the coated epoxy resin layer, wherein a thickness of the first glass substrate is bigger than that of the second glass substrate; adhering the second glass substrate to the first glass substrate with the coated epoxy resin layer; and annealing the two glass substrates after adherence.

In an embodiment, coating the edge portion of the first glass substrate corresponding to the second glass substrate with epoxy resin comprises: coating the edge portion of the first glass substrate corresponding to the second glass substrate with epoxy resin in a strip in a width of about 5-20 mm.

In an embodiment, the thickness of the first glass substrate is not less than 0.4 mm, and the thickness of the second glass substrate is not more than 0.1 mm.

In an embodiment, the epoxy resin is a non-photosensitive epoxy resin or photosensitive epoxy resin.

In an embodiment, when the epoxy resin is a photosensitive epoxy resin, the method may further comprise, before annealing said two glass substrates, performing exposing process on the two glass substrates.

In an embodiment, performing exposing process on the pair of glass substrates comprises: irradiating the two glass substrates with ultraviolet ray, and the wavelength of the ultraviolet ray is one of 365 nm, 405 nm, and 436 nm, or any combination thereof.

In an embodiment, annealing the two glass substrates comprises: placing the first glass substrate and the second glass substrate into an oven for annealing, wherein an annealing temperature is set in the range of about 40° C. to about 60° C., and when the epoxy resin is a photosensitive epoxy resin, a time period for annealing is set in the range of about 5 min to about 15 min, and when the epoxy resin is a non-photosensitive epoxy resin, a time period for annealing is set in the range of about 15 min to about 30 min.

In an embodiment, the method may further comprise: cooling the two annealed glass substrates to ambient temperature for preparing a flexible display device on the second glass substrate; and softening the coated epoxy resin and separating the first glass substrate from the second glass substrate.

In an embodiment, softening the coated epoxy resin and separating the first glass substrate from the second glass substrate comprises: contacting the two glass substrates coated with epoxy resin with acetone or 3M adhesive remover, and after the coated epoxy resin is softened by the acetone or 3M adhesive remover, separating the first glass substrate from the second glass substrate.

Another embodiment of the disclosed technology provides a method for preparing a flexible display device, comprising: providing a base substrate, comprising: coating an edge portion of a first glass substrate corresponding to a second glass substrate with epoxy resin and screeding the coated epoxy resin layer, wherein a thickness of the first glass substrate is bigger than that of the second glass substrate, adhering the second glass substrate to the first glass substrate with the coated epoxy resin layer, annealing the two glass substrates after adherence, and cooling the two annealed glass substrates to ambient temperature, wherein the second glass substrate is used as the base substrate; and preparing the flexible display device on the second glass substrate as the base substrate, which is bonded to the first glass substrate.

The method for fixing glass substrates in an embodiment of the disclosed technology enables rapid curing of epoxy resin and thereby rapid fixing together of the two glass substrates, and furthermore, no bubbles generate during the rapid curing of epoxy resin, thus assuring a good resistance effect of glass substrates against strong acid, strong base, and organic solvent and the like. When the substrates are used for preparing flat display devices, it is possible to increase the ratio of non-defective products and productivity, thus improve the product competitiveness.

Further scope of applicability of the disclosed technology will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

DETAILED DESCRIPTION

Generally, during the production processes of display devices, the display devices may be subject to treatments at a high temperature above 300 degrees Celsius and dipped into strong acid solutions, strong base solutions, and organic solvents such as iso-propyl alcohol. Therefore, the binding materials for adhering need resistances to high temperature, strong acid, strong base, and organic solvent. Epoxy resin is one of the materials with resistances to severe circumstances such as high temperature, strong acid, strong base, organic solvent etc. for a certain period. However, in high temperature curing, epoxy resin tends to generate lots of bubbles and give rise to thermal shrinking, causing gaps and cracks in sealed boundaries, and thus liquid may enter into the space between an ultrathin glass substrate and a thicker glass substrate that are bonded together. Moreover, epoxy resin will be in yellow or black color after cured at a high temperature, disadvantageously affecting the photolithography process that is conducted later. With respect to the above physical and chemical characteristics of epoxy resin, an embodiment of the disclosed technology provides a method for fixing glass substrates with epoxy resin, comprising coating the edge portion of a first glass substrate corresponding to a second glass substrate with epoxy resin and leveling (or screeding) the coated epoxy resin layer, adhering the second glass substrate to the first glass substrate with the coated epoxy resin layer, and annealing the two glass substrates after adherence.

Further detailed description about embodiments of the disclosed technology is provided below with reference to drawings.

Figure 1:
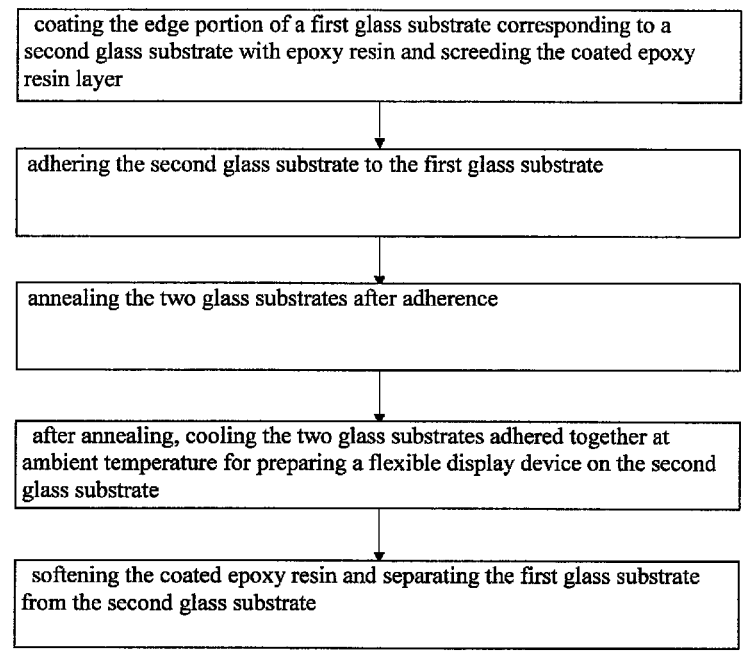
FIG. 1 is a schematic view showing the steps of a method for fixing glass substrates of a first embodiment according to the disclosed technology.

FIG. 1 is a schematic view showing the steps of a method for fixing glass substrates of a first embodiment according to the disclosed technology, by using a non-photosensitive epoxy resin. As shown in FIG. 1, the method of the first embodiment comprises the following steps.

Step 101, coating the edge portion of a first glass substrate corresponding to a second glass substrate with epoxy resin and screeding the coated epoxy resin layer.

Figure 2:
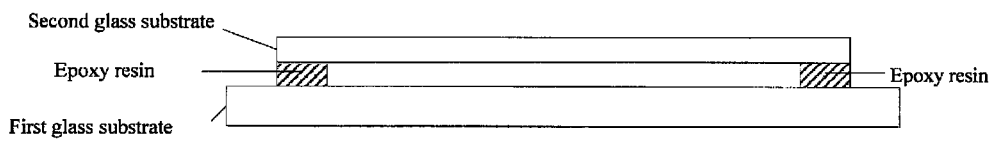
FIG. 2 is a schematic sectional view after adhering of the first glass substrate to the second glass substrate.

For example, FIG. 2 is schematic sectional view after adhering of the first glass substrate to the second glass substrate. As shown in FIG. 2, in the edge portion of the first glass substrate corresponding to the second glass substrate an epoxy resin material is coated in a strip shape in the width of about 5~20 mm. The first glass substrate is a thicker glass substrate with a thickness of not less than 0.4 mm, and the second glass substrate is an ultrathin glass substrate with a thickness of not more than 0.1 mm. The epoxy resin may be sufficiently mixed with ethylenediamine used as a curing agent. Usually, the volumetric mixing ratio of epoxy resin and ethylenediamine is about 1:1. The epoxy resin may be in a milky white color or colorless transparent; in this embodiment, the epoxy resin is a kind of non-photosensitive epoxy resin. A leveling (screeding) process is performed to the coated epoxy resin material with a strickle (or a doctor blade), so as to making the thickness of the coated epoxy resin is below 0.05 mm on the first glass substrate, and the strickle may be a long ruler, a thin glass sheet and the like.

Step 102, adhering the second glass substrate to the first glass substrate.

Step 103, annealing the two glass substrates after adherence.

For example, the first glass substrate and the second glass substrate that are adhered together are placed into an oven for an annealing process. The annealing temperature in the oven is set in the range of about 40° C. to about 60° C., the time period for annealing for the non-photosensitive epoxy resin is set in the range of about 15 min to about 30 min. Here, if the temperature for annealing is too high, the coated epoxy resin may be changed in color, generate bubbles, or produce gaps and cracks in itself. On the contrary, if the annealing temperature is too low, the used epoxy resin can not be cured completely or the curing effect is poor, thus liquid or moisture may enter into the space between the first glass substrate and the second glass substrate during the production of a flexible display device, for example. If the time period for annealing is too long, the curing effect can not further improved greatly, but also the productivity will be adversely affected.

Step 104, after annealing, cooling the two glass substrates adhered together to ambient temperature for preparing a flexible display device on the second glass substrate.

For example, the annealed first glass substrate and the second glass substrate are taken out from the annealing oven. After the two glass substrates are cooled to the ambient temperature, a flexible display device can be made on the second glass substrate with the two glass substrates being still adhered together according to a conventional method. Usually, the ambient temperature is about 15~30° C., and preferably, the ambient temperature is about 23° C.;

The conventional method for producing the flexible display device may comprise the steps of: firstly, a metal layer is deposited on the second glass substrate, then the two glass substrates with the metal layer are subject to an exposure process by using a photomask, an etching process, and finally a photoresist removing process, the above procedures are repeated for 4~6 times to obtain desired patterns (e.g., active array patterns) on a substrate.

Step 105, softening the coated epoxy resin and separating the first glass substrate from the second glass substrate.

For example, the two glass substrates adhered with the coated epoxy resin is dipped into acetone or 3M adhesive remover, thus the coated epoxy resin is softened by acetone or 3M adhesive remover; and after the coated epoxy resin is softened, the first glass substrate can be separated from the second glass substrate.

Figure 3:
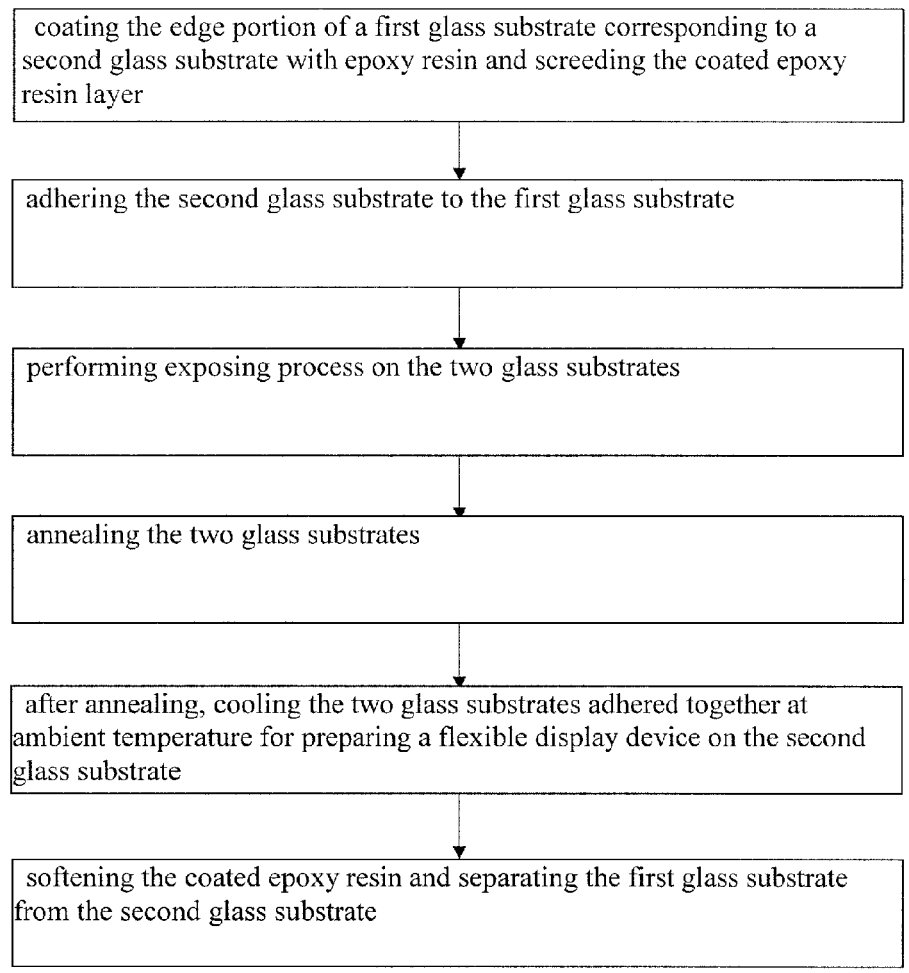
FIG. 3 is a schematic view showing the steps of a method for fixing glass substrates of a second embodiment according to the disclosed technology.

FIG. 3 is a schematic view showing the steps of a method for fixing glass substrates of a second embodiment according to the disclosed technology, in which a photosensitive epoxy resin is used. As shown in FIG. 3, the method according to the second method comprises the following steps.

Step 301, coating the edge portion of a first glass substrate corresponding to a second glass substrate with epoxy resin and screeding the coated epoxy resin layer.

For example, FIG. 2 is a schematic sectional view after adhering of the first glass substrate to the second glass substrate. As shown in FIG. 2, in the edge portion of the first glass substrate corresponding to the second glass substrate an epoxy resin material is coated in a strip shape in the width of about 5~20 mm. The first glass substrate is a thicker glass substrate of not less than 0.4 mm in thickness, and the second glass substrate is an ultrathin one of not more than 0.1 mm in thickness. The epoxy resin may be sufficiently mixed with ethylenediamine used as a curing agent. Usually, the volumetric mixing ratio of epoxy resin and ethylenediamine is about 1:1. The epoxy resin may be in a milky white color or colorless transparent. In this embodiment, the epoxy resin is a kind of photosensitive epoxy resin. A leveling (screeding) process is performed to the coated epoxy resin material with a strickle (or a doctor blade), so as to making the thickness of the coated epoxy resin is below 0.05 mm on the first glass substrate, and the strickle may be a long ruler, a thin glass sheet and the like.

Step 302, adhering the second glass substrate to the first glass substrate.

Step 303, performing exposing process on the two glass substrates.

For example, with a kind of photosensitive epoxy resin, an exposing process is performed with respect to the two glass substrates after the second glass substrate is adhered to the first glass substrate. That is, the entirety of the two glass substrates is irradiated with ultraviolet ray. The wavelength of the ultraviolet ray may be one of 365 nm, 405 nm, and 436 nm, or any combination thereof. The intensity for exposure is determined according to the thickness of the coated epoxy resin. Herein, performing exposing process on the two glass substrates is an initial step for rapid curing the coated epoxy resin, so as to fix the shape of the resin.

Step 304, annealing the two glass substrates.

For example, the first glass substrate and the second glass substrate after exposure are placed into an oven for annealing process, to improve the curing effect of the coated epoxy resin. The annealing temperature in the oven is set in the range of about 40° C. to about 60° C., the time period for annealing for photosensitive epoxy resin is set in the range of 5 min to 15 min. Herein, if the temperature for annealing is too high, epoxy resin will be changed in color, generate bubbles or produce gaps and cracks in itself On the contrary, if the temperature is too low, the epoxy resin can not cure completely or the curing effect is poor, thus liquid or moisture may enter into the space between the first glass substrate and the second glass substrate in the production of a flexible display device, for example. If the time period for annealing is too long, the curing effect can not further improved greatly, but also the productivity will be adversely affected.

The steps 305 to 306 can be performed the same as steps 104 to 105.

Another embodiment of the disclosed technology provides a method for preparing a flexible display device based on the above-described embodiment. The method comprises the steps of: providing a base substrate and preparing the flexible display on the base substrate. The step of providing a base substrate comprises: coating an edge portion of a first glass substrate corresponding to a second glass substrate with epoxy resin and screeding the coated epoxy resin layer, wherein a thickness of the first glass substrate is bigger than that of the second glass substrate, adhering the second glass substrate to the first glass substrate with the coated epoxy resin layer, annealing the two glass substrates after adherence, and cooling the two annealed glass substrates to ambient temperature, wherein the second glass substrate is used as the base substrate. The flexible display device is prepared on the second glass substrate as the base substrate, which is bonded to the first glass substrate.

Further, after preparing the flexible display device, the coated epoxy resin is softened and the first glass substrate is separated from the second glass substrate with the flexible display device formed thereon.

The above are only the preferred embodiments of the disclosed technology, and do not intend to limit the protective scope of the disclosed technology. All modifications, alterations and developments made in the spirit and principles of this disclosed technology should be contained in the protective scope of this disclosed technology.

What is claimed is:

1. A method for fixing glass substrates, comprising:
coating an edge portion of a first glass substrate corresponding to a second glass substrate with epoxy resin and screeding the coated epoxy resin layer, wherein a thickness of the first glass substrate is bigger than that of the second glass substrate;
adhering the second glass substrate to the first glass substrate with the coated epoxy resin layer; and
annealing the two glass substrates after adherence.

2. The method according to claim 1, wherein coating the edge portion of the first glass substrate corresponding to the second glass substrate with epoxy resin comprises:
coating the edge portion of the first glass substrate corresponding to the second glass substrate with epoxy resin in a strip in a width of about 5-20 mm.

3. The method according to claim 2, wherein the thickness of the first glass substrate is not less than 0.4 mm, and the thickness of the second glass substrate is not more than 0.1 mm.

4. The method according to claim 2, wherein the epoxy resin is a non-photosensitive epoxy resin or a photosensitive epoxy resin.

5. The method according to claim 2, wherein annealing the two glass substrates comprises:
placing the first glass substrate and the second glass substrate into an oven for annealing, wherein an annealing temperature is set in the range of about 40° C. to about 60° C., and
when the epoxy resin is a photosensitive epoxy resin, a time period for annealing is set in the range of about 5 min to about 15 min, and when the epoxy resin is a non-photosensitive epoxy resin, a time period for annealing is set in the range of about 15 min to about 30 min.

6. The method according to claim 1, wherein the thickness of the first glass substrate is not less than 0.4 mm, and the thickness of the second glass substrate is not more than 0.1 mm.

7. The method according to claim 1, wherein the epoxy resin is a non-photosensitive epoxy resin or a photosensitive epoxy resin.

8. The method according to claim 7, when the epoxy resin is a photosensitive epoxy resin, further comprising performing exposing process on the two glass substrates before annealing said two glass substrates after adherence.

9. The method according to claim 8, wherein performing exposing process on the two glass substrates comprising:
irradiating the two glass substrates with ultraviolet ray, and the wavelength of the ultraviolet ray is one of 365 nm, 405 nm, and 436 nm, or any combination thereof.

10. The method according to claim 1, wherein annealing the two glass substrates comprises:
placing the first glass substrate and the second glass substrate into an oven for annealing, wherein an annealing temperature is set in the range of about 40° C. to about 60° C., and
when the epoxy resin is a photosensitive epoxy resin, a time period for annealing is set in the range of about 5 min to about 15 min, and when the epoxy resin is a non-photosensitive epoxy resin, a time period for annealing is set in the range of about 15 min to about 30 min.

11. The method according to claim 1, further comprising:
cooling the two annealed glass substrates to ambient temperature for preparing a flexible display device on the second glass substrate; and
softening the coated epoxy resin and separating the first glass substrate from the second glass substrate.

12. The method according to claim 11, wherein softening the coated epoxy resin and separating the first glass substrate from the second glass substrate comprises:
contacting the two glass substrates coated with epoxy resin with acetone or adhesive remover, and
after the coated epoxy resin is softened by the acetone or adhesive remover, separating the first glass substrate from the second glass substrate.

13. A method for preparing a flexible display device, comprising:
providing a base substrate, comprising:
coating an edge portion of a first glass substrate corresponding to a second glass substrate with epoxy resin and screeding the coated epoxy resin layer, wherein a thickness of the first glass substrate is bigger than that of the second glass substrate,
adhering the second glass substrate to the first glass substrate with the coated epoxy resin layer,
annealing the two glass substrates after adherence, and
cooling the two annealed glass substrates to ambient temperature, wherein the second glass substrate is used as the base substrate; and
preparing the flexible display device on the second glass substrate as the base substrate, which is bonded to the first glass substrate.

14. The method according claim 13, further comprising:
softening the coated epoxy resin and separating the first glass substrate from the second glass substrate with the flexible display device formed thereon.

* * * * *